Feb. 27, 1940. B. J. BENNETT 2,191,554
CARBON FEEDING DEVICE FOR TYPEWRITERS
Filed Nov. 12, 1938 3 Sheets-Sheet 1

Inventor,
Benjamin James Bennett,
by Frank S. Appleman
attorney.

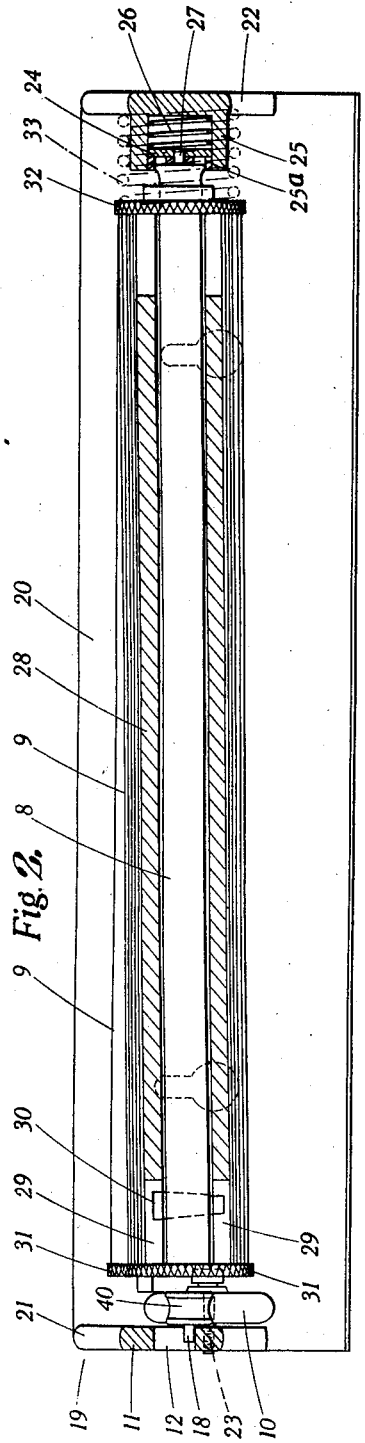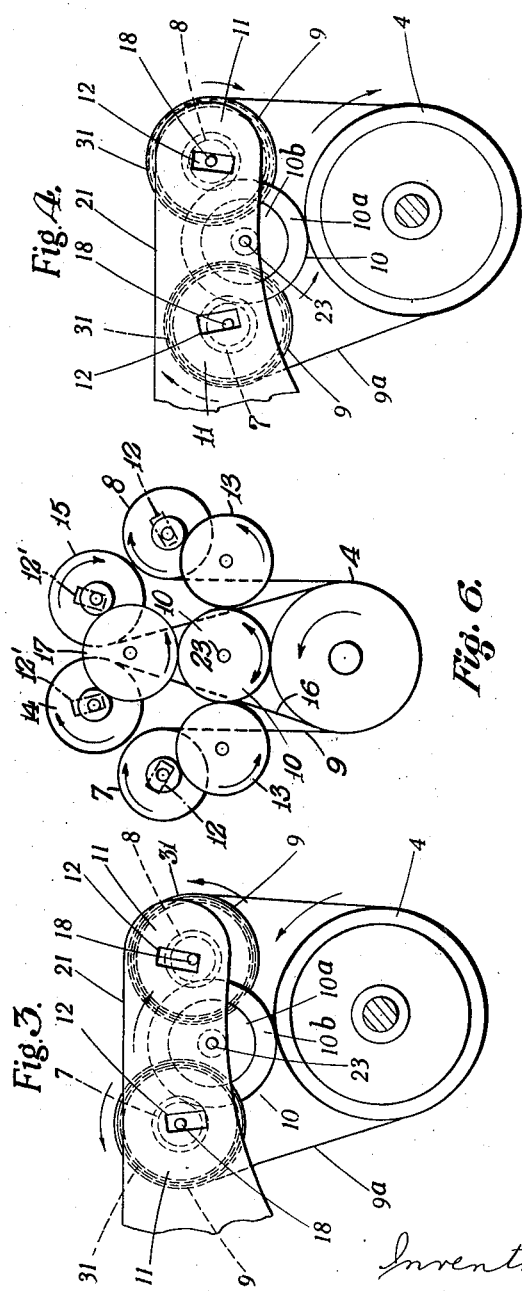

Feb. 27, 1940.          B. J. BENNETT          2,191,554
CARBON FEEDING DEVICE FOR TYPEWRITERS
Filed Nov. 12, 1938          3 Sheets-Sheet 3
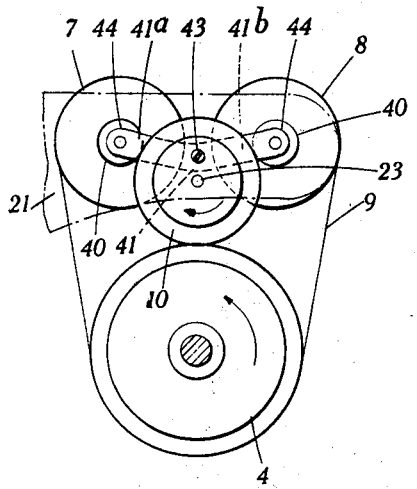
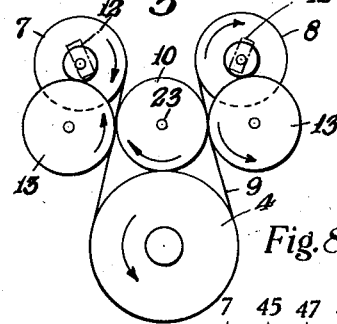
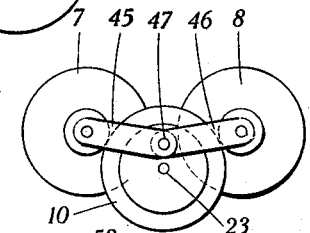
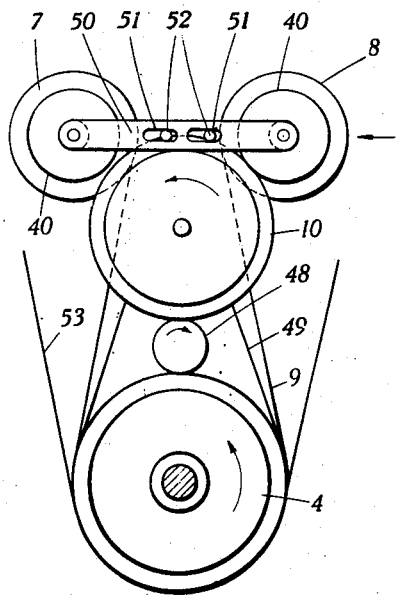
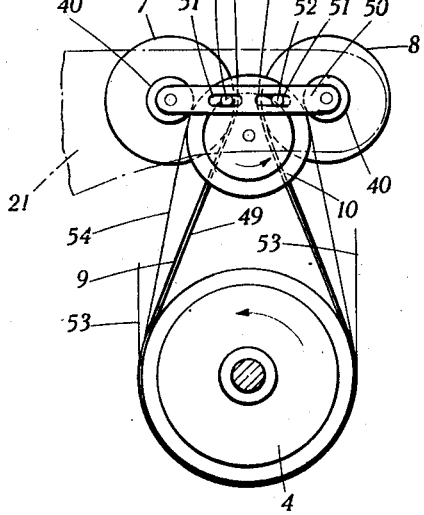
Inventor,
Benjamin James Bennett,
by
Frank S. Appleman,
Attorney Patented Feb. 27, 1940

2,191,554

UNITED STATES PATENT OFFICE 2,191,554

CARBON FEEDING DEVICE FOR TYPEWRITERS

Benjamin James Bennett, Leicester, England

Application November 12, 1938, Serial No. 240,154
In Great Britain May 13, 1938

3 Claims. (Cl. 197—131)

This invention appertains to means for feeding carbon paper, inked fabric or like copy producing material in continuous form through a typewriter or like machine. The carbon paper, inked fabric or like material (hereinafter referred to as the copying material) is wound upon rollers and in use in the typewriter or similar machine passes from one roller to another in continuous length like the usual typewriter ribbon which unwinds from one spool and is wound up upon another. With means of the kind concerned the copying material unwinds from one roller and is wound up upon another, and intermediate of the two rollers, i. e., while passing from the one to the other, is used for its intended purpose, which may be for producing a duplicate copy of the original, as in typewritten correspondence, or for making a master copy as in the hectograph or other similar process from which master copy the requisite copies are subsequently produced.

During its passage from the one roller to the other the copying material passes under the cylindrical platen of the typewriter or similar machine.

There may be one pair of rollers for one length of copying material, as for instance, in the case where one duplicate copy or a master copy is to be made, or there may be two or even more pairs of rollers for two or more lengths of copying material, as for instance, when two or more copies of the original are to be produced simultaneously with the typewriting.

The present invention includes an arrangement comprising two or more rollers upon which copying material is wound and means whereby one at least of said rollers is rotatively driven independently of the copying material when the cylindrical platen of the typewriter or like machine, to which the arrangement is applied, is rotated, the said rollers and driving means being so related that irrespective of the direction in which the platen of the machine is rotated, the rotational drive will be transmitted only to the roller or rollers which is or are to wind up the copying material, thus leaving the corresponding unwinding roller or rollers free or comparatively free to discharge the copying material.

In the accompanying drawings—

Fig. 2 is a longitudinal sectional view of the device taken on the line IV—IV of Figure 1.

Figures 3 and 4 are two diagrams illustrating the manner in which the rotational drive is transmitted from the platen of the typewriter to whichever of the two rollers of the device is to serve as the winding roller.

Figure 5 is a diagrammatic representation of an alternative roller driving arrangement suitable for use when a length of copying material is to be used for producing a duplicate copy as in typewritten correspondence.

Figure 6 is a somewhat similar view showing a still further arrangement suitable for use when two lengths of copying material are required to be run through the machine for making two copies simultaneously with the typing of the original.

Figure 7 is a diagrammatic representation of an arrangement in which a pair of rollers is mounted on a rocking member, as will be hereinafter described.

Figure 8 is a detail view showing a modification thereof.

Figures 9 and 10 are two views similar to Figure 7 illustrating further arrangements.

Like parts are designated by similar reference characters throughout the drawings.

Figure 1:
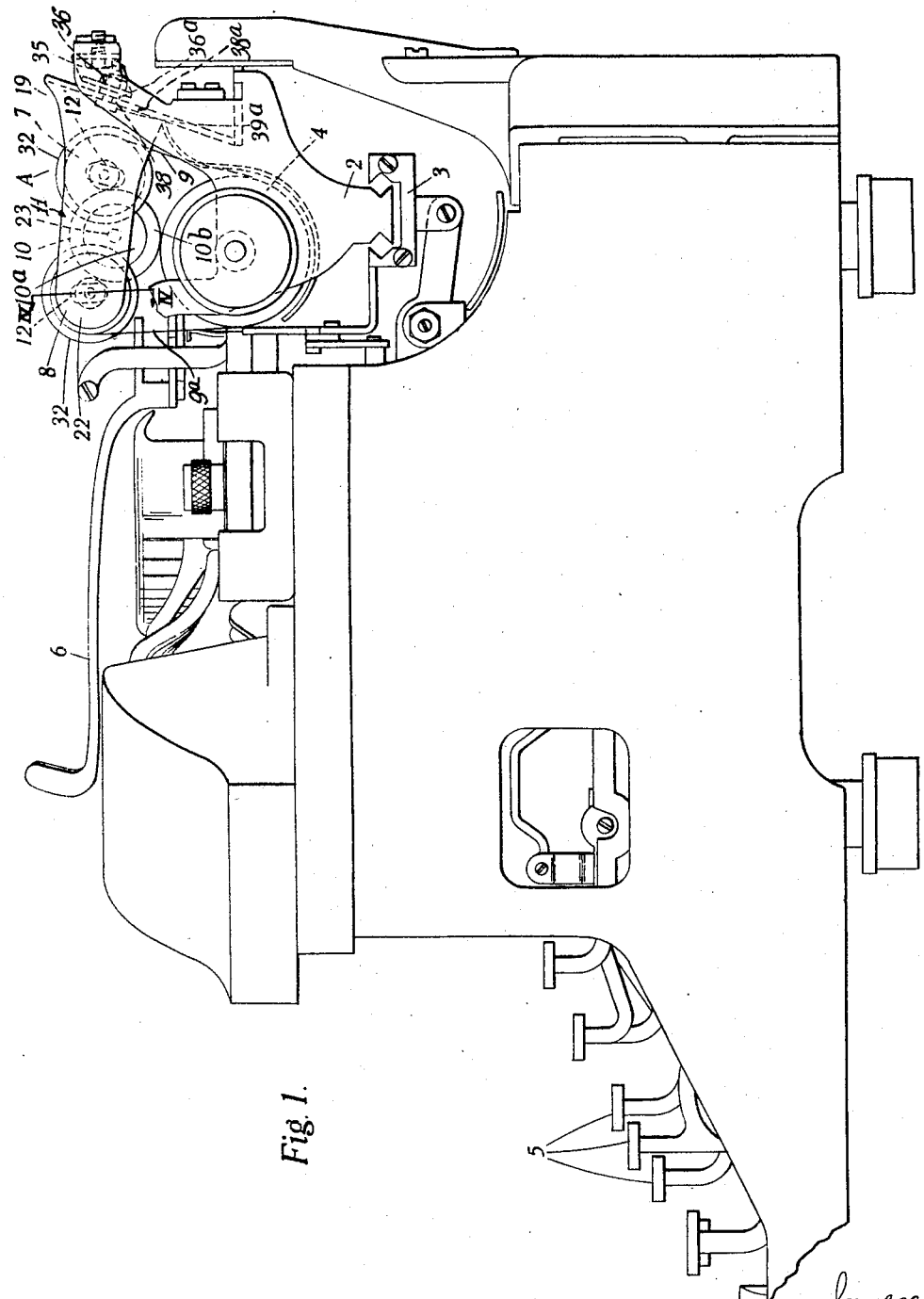
Figure 1 is a side elevational view of so much of a standard typewriter as is necessary to illustrate the application thereto of an attachment device embodying one practical form of copying material feeding means provided by the invention.

Referring to Figure 1, the reference numeral 1 designates the main frame of a standard typewriter, 2 indicates the carriage which is movable longitudinally along a guideway 3 arranged at the back of the machine, and the cylindrical platen which is mounted on the carriage is indicated at 4. A few of the typewriter keys are represented at 5 and at 6 there is shown the customary line space and carriage return lever.

Mounted on a part of or on the carriage 2 in the manner hereinafter to be described and disposed above but close to the platen 4 is a copying material feeding device A which, as will be seen, comprises a pair of rollers 7 and 8 upon which a continuous length of copying material 9 is wound. In use the said material passes from one roller to the other and the portion 9a between the rollers extend under the platen as shown in Figures 1, 3 and 4. The two rollers are spaced apart above the platen 4 and the necessary rotational drive is imparted to said rollers by an intermediate driving member 10 in contact both with them and the platen.

In the specific example now being described the rollers 7 and 8, in the region of the drive transmitting means, are mounted in slotted bearings 11 which are so disposed that bodily movement of the rollers to and fro along the slots 12 has the effect of bringing the rollers towards and from the driving member 10 thus varying the driving effect of the latter. For instance, if, as shown, a frictional driving member such as a friction wheel 10 is employed then this may have close frictional contact with the rollers when they are at one, i. e., the lower, end of their bearing slots 12 (see, for example, the roller 8 in Figure 3) and when they are at or disposed towards the other end of said slots they may be clear of the friction wheel or have but slight contact with it. The arrangement is such that when the driving friction wheel 10 turns one way it tends to move the rollers towards one end of their bearing slots and when it turns the other way it tends to move the rollers towards the other end of the bearing slots. Thus, referring to Figure 3, the driving friction wheel 10 is shown as turning in a clockwise direction as the result of which the roller 8 is moved to the lower end of its bearing slot 12, whilst the roller 7 is moved in the opposite direction towards the upper end of the corresponding slot. Conversely, when, as shown in Figure 4, the wheel 10 is turned in an anti-clockwise direction, the roller 8 moves upwards towards the upper end of its slot and the roller 7 moves downwards slightly in a direction towards the lower end of the other slot. In the arrangement shown the slotted bearings 11 permit the rollers 7 and 8 to move bodily towards and from the intermediate wheel 10 in an oblique manner with the result that the latter when rotated in one direction by the platen 4 acts on one roller to draw it towards or into the near end of its bearing slot and thereby increase the contact for imparting frictional drive and at the same time acts on the other roller to push it to or towards the remote end of its bearing slot and thereby reduce the contact for imparting less frictional drive. Accordingly one roller is strongly frictionally driven to wind up the copying material while the other is but lightly driven or can slip or is free to rotate to allow the copying material to unwind therefrom. If in this arrangement the direction of rotation of the platen is reversed, then the effect of the oppositely rotating intermediate wheel upon the rollers is reversed, that is to say it will push the first mentioned roller away and draw the second roller inwards, thereby transmitting the rotational drive to the latter and leaving the former free. This will now be made clearer with reference to Figures 3 and 4. In Figure 3 the platen 4 is shown as being rotated in an anti-clockwise direction, so that the intermediate friction wheel 10 is rotating clockwise. In these circumstances the said wheel acts on the roller 8 to draw it down slightly and thereby increase the contact as aforesaid and at the same time acts on the roller 7 to lift it slightly and correspondingly reduce the contact. Thus the roller 8 is strongly driven to wind up the copying material 9 while the roller 8 is but lightly driven or can slip or is free to rotate to enable the said material to unwind therefrom. Figure 4 represents reverse conditions. That is to say, the direction of rotation of the platen 4 has been reversed so that it is rotating in a clockwise direction and the intermediate friction wheel 10 is turning in an anti-clockwise direction. As a result, the friction wheel tends to push the roller 8 away and this time draws the roller 7 inwards so that the rotational drive is transmitted to the latter while the roller 8 is free to slip or rotate; consequently the copying material is now unwound from the roller 8 onto the roller 7.

The arrangement just described is suitable where the copying material is to be used for making a master copy, such as for the hectograph process, in which case the said copying material, as shown in Figures 1, 3 and 4, winds onto the outside of each roller of the pair.

When, however, the continuous length of copying material 9 is to be employed for producing a duplicate copy as in typewritten correspondence, said material is wound onto the two rollers 7 and 8 on the inside of the pair, as shown in Figure 5, and each roller instead of being driven directly by the intermediate wheel 10 is driven by or from the latter by a further wheel 13. That is to say there is one wheel 10 (main driver) driven by the platen 4 and two other wheels 13 (secondary drivers) driven by the main driver 10 and each secondary wheel 13 drives its respective roller. The rollers 7 and 8 are mounted in bearing slots 12 which are so disposed in relation to the secondary drivers 13 as to allow the latter to shift the rollers in the manner previously described so that when revolving in one direction the secondary drivers will drive the rollers and when revolving in the other direction they will allow the rollers to slip or run free.

If two lengths of copying material are required to be run through the machine for making two copies simultaneously with the typing of the original, then, as shown in Figure 6, a further pair of rollers 14 and 15 for the additional copying material 16 may be associated with the arrangement last described, these rollers being driven by a wheel 17, common to both, which is driven by the aforesaid main driver 10. In this case the additional copying material 16 is wound onto the rollers 14 and 15 on the inside of the pair and said rollers are mounted in slots which are represented diagrammatically at 12' and so disposed in relation to the driving wheel 17 as to enable the latter to act upon the rollers in the same manner as in the previously described arrangements.

In the arrangements herein described, the rollers in the one or more pairs are spaced and positioned in such relation to the platen 4 as to allow for introduction of the one or more sheets of paper into the machine. For hectograph work the master sheet passes round the platen on the outside of the copying material 9. For making a duplicate copy (Figure 5) one sheet of paper (for the original) passes on the outside and one sheet of paper (for the copy) on the inside of the copying material, and when there are two lengths 9 and 16 of copying material (Figure 6) a sheet of paper also passes between the two lengths.

The bearing slots in which the rollers are mounted may, as shown, be closed at both ends and may be straight, curved, arcuate, eccentric or of other suitable form, and those for each pair of rollers may be relatively inclined, aligned or parallel. A convenient arrangement is the one illustrated wherein the slots 12 (or 12') in the pair or in each pair are relatively inclined somewhat in V fashion, but the relative disposition of the slots may vary and will to some extent depend upon the size and disposition of the member which transmits the drive to the roller. For engaging with the appropriate bearing slot each of the rollers preferably has a reduced or pintle end 18.

If, as is mainly the intention, the rollers are to be driven at one end only their opposite ends may be carried by or mounted in non-slotted bearings such as those hereinafter to be described, but if they are to be driven at both ends then both ends would be mounted in slotted bearings if the rollers are to be bodily adjustable.

In all cases it is important that the bearing slots shall be disposed so as to guide each roller towards and from the drive transmitting member, and the preferred arrangement is such that the driving member has a wedging action on the roller to hold it in position for being driven and that when the roller is displaced from the drive receiving position it is practically free to rotate and only just sufficient frictional contact between the said roller and the driving member remains to enable the latter, upon its direction of rotation being reversed, to draw or push the roller down the slot to the drive receiving position. To produce this result the slot may be tangential to the driving member (see Figures 3 and 4).

Instead of ranging the rollers in slotted bearings they may be carried by bearings which are pivoted or otherwise movable in relation to the driving member to give the same result as that described.

Instead of mounting the rollers to be bodily adjustable they may be carried by fixed bearings and the drive transmitting member may, for the same purpose, be floating, e. g. mounted in a slotted or movable bearing, so as to be movable relatively to the rollers or to wheels which drive them.

Whilst the means constituting the invention may be incorporated in any suitable manner in a typewriter or like machine, it is mainly intended to carry out the invention in the form of an attachment device, one practical example of which will now be described with reference to Figures 1 and 2, said device being adapted for application to the carriage of a typewriter or like machine. As will be seen, the said device comprises a frame 19 in which the rollers 7 and 8 are mounted and which also carries the driving means, i. e. the driving friction wheel 10. This frame conveniently consists of an inclined back member 20 and two side members 21 and 22 which are rigidly secured in any suitable manner to said back member at opposite ends thereof. The side members project from the back member at right angles thereto and the member 21, that is to say the one at the left hand side of the frame, is formed with a pair of straight slots 12—one for each roller—these slots being relatively inclined as hereinbefore described and adapted for reception of the reduced or pintle ends 18 of the rollers. The portion of the side member 21 surrounding the slots 12 can thus be regarded as the bearings for the rollers at that end of the frame 19. The side member 21 also carries a small spindle or pin 23 upon which is mounted the friction wheel 10. This spindle or pin may, as shown, be screwed into the member 21 but, in any event, is disposed slightly below and centrally between the slots 12. The wheel 10 is, of course, located at the inner side of the member 21 and the spindle or pin 23 extends at right angles to said member. At the end of the frame remote from the slotted bearing and the associated driving wheel 10 the end of each of the rollers 7 and 8 is conveniently mounted to rotate in a spring pressed block or similar part such as that indicated at 24 in Figure 2. Each of these parts, as will be seen, is accommodated within a cylindrical or like bearing such as 25 provided on the side member 22 and is controlled by means of a compression spring 26 which bears at one end at the back of the part 24 and at the other end on the inside of the said side member. At its open end each of the bearings 25 is shouldered as at 25a or otherwise suitably formed to retain the corresponding spring pressed part in position. Conveniently, and as shown, each of the rollers is reduced at its end remote from the driving means to provide a pintle 27 for engagement in a small circular hole formed in the corresponding part 24 which latter may serve as a pivot to permit of the required bodily movements of the driven end of the roller to take place. The construction is such, moreover, that the rollers can be readily removed from the frame 19 (for instance to permit them to be changed over when one becomes full and the other empty) merely by pushing them from their driven ends against the spring action to withdraw their reduced or pintle ends 18 from the slotted bearings and then withdrawing the ends 27 from the bearings 25 prior to lifting the rollers bodily clear of the frame. In the specific example now being described each of the rollers 7 and 8 may conveniently be of the form shown in Figure 2, that is to say it may be generally of spindle-like form and appropriately reduced at its ends to provide the pintles 18 and 27 aforesaid. Each roller, moreover, is adapted to carry a cardboard or other suitable spool 28 upon which the copying material can be wound. In this connection the spools are each formed with open-ended longitudinally extending slots 29 adapted for reception of the opposite ends of a wedge-shaped or other suitable transverse pin 30 or the equivalent which is rigidly secured to the corresponding roller. Thus, as will be understood, the pin 30 (or its equivalent) serves as a means of transmitting the rotary motion of the roller to the spool, or in other words acts, in effect, to connect the spool to the roller. Each of the said rollers may, as shown, have formed integrally therewith or rigidly secured thereto near its driven end a cap or flange 31 against which the corresponding spool 28 abuts. These caps or flanges therefore serve to determine the position of the spools axially upon the rollers. Removable end caps or washers 32, similar to the fixed caps 31, are applied to the rollers at their opposite ends to permit of the wound spools 28 being slipped on and off the rollers as and when required. Conveniently the caps or washers 32 are slidable and loose upon the rollers.

The frame 19 is intended to be attached to the carriage 2 of the machine or to a part mounted on and movable with said carriage, such, for instance, as the tabulator rack 34 (Figure 1) or the conventional paper table or back plate (not shown). The whole device, however, secured in position, lies close to the platen 4 and does not disturb the normal entry or back-feeding of forms or sheets into the machine and does not interfere with visibility at the writing point. Another advantage of arranging the rollers low down on the machine is that it enables the typist readily to observe the insertion of paper. In the specific example illustrated the device is made for attachment to and removal from the machine in a ready manner, now to be described, without calling for any or but little modification of standard equipment. Thus, in the arrangement shown in Figure 1, the back member 20 is removably fastened to two arms or short bars such as that indicated at 35 which are in turn secured to the front of the tabulator rack 34. A hole is made in each arm or bar 35 and a screw socket 36 is fastened therein by means of a locknut 37 which is disposed at the back of said arm or bar. The back member 20 aforesaid has formed in it two inverted keyhole apertures 38 the enlarged portions 38a of which are adapted to pass freely over the heads 39a of screws 39 screwed into the sockets 36. When the frame 19 is in position the shanks 39b of the said screws extend through the narrow slot-like portions of the keyhole apertures and by tightening up the screws the frame becomes securely clamped between the heads of the sockets 36 and heads 36a formed on the sockets. In this way the device is effectively secured in position. To remove the device, all that is necessary is to slacken off the screws 39 and manipulate the frame so that the enlarged portions of the keyhole apertures therein are drawn over the heads of said screws. A similar construction would be adopted in the event of the device being removably attached to the forwardly inclined paper table or back plate with which the majority of standard typewriters are provided, but in this instance the sockets 36 would be fastened in the said table or back plate instead of in arms or bars such as 35.

When once applied to a machine by a device such as herein described, the copying material may be wound backwards and forwards many times without changing by simply rotating the platen.

The same copying material feeding means or device embodying the invention may be used in connection with sheet or continuous form of stationery.

If the driven ends of the rollers are mounted in movable instead of slotted bearings, then the rollers at their opposite ends may be mounted to rotate in spring pressed blocks or similar parts as in the example last described.

When the rotational drive is transmitted by one or more friction wheels, this or these may be of any kind suitable for the purpose. In a preferred form the wheel or each wheel consists, as shown in the drawings, of a metal hub 10a having a rubber tyre or periphery 10b. In the previously described arrangement where an intermediate wheel 10 driven by the platen 4 drives the two rollers 7 and 8 the said intermediate wheel advantageously has a rubber tyre or rim of rounded cross section which bears upon the surface of the cylindrical platen and engages frictionally with correspondingly grooved portions 40 of the rollers.

Instead of driving the rollers by friction, driving means comprising toothed gears may, if desired, be employed, in which instance when one of the rollers is lifted bodily as aforesaid the appropriate gears are disengaged and put out of mesh so that said roller can rotate freely for unwinding.

The rotational drive may be transmitted to the rollers by any type of gearing such as frictional or toothed gearing but frictional gearing is preferred. The drive may be taken from the surface of the cylindrical platen itself as described or from part or parts rotatable with it. For example, one or more friction wheels or equivalent elements may be driven by the platen cylinder, or the latter or its spindle may have upon it one or more gear wheels with which a drive transmitting wheel or wheels may mesh. When the rotational drive is transmitted from the platen to the rollers by one or more intermediate friction or gear wheels according to the direction of rotation required, the said drive may be taken direct upon the rollers or by one or more friction or gear wheels thereon. The rotational drive may be transmitted to the rollers at one or each end thereof.

In the arrangement illustrated in Figure 7 the rollers 7 and 8, instead of being mounted in slotted bearings, are mounted on a two-armed rocking member 41 which is conveniently pivoted at 42 to the side member 21 of the frame so that it is free to oscillate whereby each of the arms 41a and 41b can move upwards or downwards according to the direction of rotation of the drive transmitting wheel 10, this in turn of course being determined by the direction of rotation of the cylindrical platen 4. The rocking member 41 may, for instance, be pivotally mounted on or in the frame either by means of a screw 43 or by reason of said member being formed with a pivot pin which projects into a bearing provided on or in the side member 21. In Figure 7 the two rollers are shown as being in the neutral position. If, however, the platen 4 is turned in the direction of the arrow, i. e., anti-clockwise, the result will be that the arm 41b will move downwards thereby causing the roller 8 to engage the wheel 10 in such a manner that said roller will be strongly driven to wind up the copying material 9, whilst the arm 41a and hence also the roller 7 will move upwards slightly in a direction away from the wheel so that the last mentioned roller will be but lightly driven or allowed to slip or rotate to allow the copying material to unwind therefrom. Conversely, if the platen is turned in the reverse direction, then the arm 41a and the roller 7 will move downwards towards the wheel 10 whilst the arm 41b and the roller 8 will move upwards away from said wheel, thereby achieving precisely the same result as though the rollers were mounted in the slotted bearings hereinbefore described. The rollers 7 and 8 are formed with pintles 44 or the like which are engaged in holes or bearings within the arms 41a and 41b. As will be understood, rocking movement is imparted to the member 41 to permit the rollers to move in the required manner from the platen 4 through the drive transmitting wheel 10.

Instead of there being provided a single rocking member as just described, this may be replaced by two separate arms 45 and 46—one for each roller—which arms are pivoted together and attached to the frame as at 47 (see Figure 8).

In Figure 9 there is illustrated an arrangement which is somewhat simpler than and can be used as an alternative to that hereinbefore described with reference to Figure 5 for producing a duplicate copy as in typewritten correspondence. As will be seen, a further driving wheel 48 is interposed between the platen 4 and the driving wheel 10 for the purpose of reversing the direction of rotation of the rollers 7 and 8 as compared, for instance, with the rollers in such arrangements as those shown in Figures 3 and 4 and in Figure 7. The object of this is to enable the copying material to be wound onto the rollers on the inside instead of on the outside of the pair, the advantage of this being that a sheet 49 of paper inserted between the platen and the copying material 9 can emerge freely from the platen without becoming wound together with said material upon whichever happens to be the winding up roller. The rollers in the arrangement just described may if desired be mounted in slotted bearings, provided the slots are appropriately disposed, or, as shown, the said rollers may be mounted on a horizontally slidable bar such as 50. To enable the said bar to slide in either direction it is conveniently slotted as at 51 for engagement with pins 52 or the like on the frame of the attachment and the construction is such that according to the direction in which the platen is rotated, the bar will be caused by the driving wheel 10 to move rectilinearly one way or the other so as to bring one of the rollers strongly into contact with the wheel and to move or tend to move the other roller away from said wheel. Thus, for instance, assume that the platen is rotated in the direction of the arrow; then the driving wheel 10 will rotate in the same direction and transmit movement to the bar 50 through the portion 40 of the roller 8, whereupon the bar will move to the left with the result that the roller 8 will be moved towards the wheel 10 and thereby driven by the latter to wind up the material 9, whilst the roller 7 will be moved away from the wheel so that the material can be readily unwound from said last mentioned roller and vice versa. In Figure 13 the sheet of paper on which the original is typed is indicated at 53.

Referring now to the arrangement shown in Figure 10 which is also for producing a duplicate copy as in typewritten correspondence, the driving wheel 10 is frictionally driven from the platen 4 by means of an endless driving band or belt 54 so that the wheel does not make actual contact with the platen. In an arrangement of this character, a second and intermediate driving wheel may, if desired, be provided and the rollers 7 and 8 may be mounted in slotted bearings or on a rocking member such as that hereinbefore described, or, as shown, on a slidable bar 51.

What I claim then is:

1. Mechanism for feeding copy producing material through a type-printing machine having a cylindrical platen, comprising in combination, two rollers from one of which copying material unwinds and is wound up on the other, a friction wheel which is interposed between and arranged in contact both with said rollers and the platen, said wheel transmitting the rotational drive from said platen to one of the rollers for winding up said material when the platen is rotated in one direction and to the other of said rollers when the platen is rotated in the reverse direction, and, in the region of the said friction wheel, slotted bearings for the rollers which bearings permit said rollers to move bodily towards and from the said wheel in an oblique manner so that when the latter is rotated by the platen in either direction it acts on the appropriate roller to increase its contact therewith for imparting frictional drive and at the same time acts on the other roller to reduce its contact therewith, for the purpose herein specified.

2. In a device of the kind described, a driven platen, a pair of rollers adapted to receive the end portions of material wound around said platen, driving means interposed between said platen and said rollers, and a shiftable roller supporting means for drivingly connecting the platen to a selected roller.

3. In a device of the kind described, a rotary platen, a pair of rollers supporting opposite ends of a web, said web being arranged to pass from one of said rollers around the platen and to the other of said rollers, driving means connecting respective rollers to said platen, each of said driving means being arranged to rotate a respective roller for winding the web thereon, and means to shift said driving means to bring the roller upon which material is to be wound into driving relation with said platen.

BENJAMIN JAMES BENNETT.